(12) United States Patent
Engdahl et al.

(10) Patent No.: US 6,303,935 B1
(45) Date of Patent: Oct. 16, 2001

(54) COMBINATION PET/SPECT NUCLEAR IMAGING SYSTEM

(75) Inventors: John C. Engdahl, Elliott City, MD (US); Angelo Rago, Arlington Hts., IL (US)

(73) Assignee: Siemens Medical Systems, Inc., Iselin, NJ (US)

( * ) Notice: Subject to any disclaimer, the term of this patent is extended or adjusted under 35 U.S.C. 154(b) by 0 days.

(21) Appl. No.: 09/316,189

(22) Filed: May 21, 1999

(51) Int. Cl.[7] ..................................................... G01T 1/164
(52) U.S. Cl. ............................... 250/363.03; 250/363.05; 250/363.09
(58) Field of Search ........................ 250/363.03, 363.02, 250/363.04, 369, 370.09, 370.11, 252.1

(56) References Cited

U.S. PATENT DOCUMENTS

| | | | |
|---|---|---|---|
| 5,608,221 | * | 3/1997 | Bertelsen et al. ............... 250/363.03 |
| 5,742,060 | * | 4/1998 | Ashburn ........................... 250/370.09 |
| 6,169,285 | * | 1/2001 | Petrillo et al. ....................... 250/369 |
| 6,171,243 | * | 1/2001 | Gagnon et al. ................. 250/363.03 |
| 6,175,116 | * | 1/2001 | Gagnon et al. ................. 250/363.03 |
| 6,194,728 | * | 2/2001 | Bosnajakovic .................. 250/370.11 |

* cited by examiner

Primary Examiner—Constantine Hannaher
Assistant Examiner—Otilia Gabor

(57) ABSTRACT

A combination PET/single photon (SPECT or planar) nuclear imaging system utilizes a pair of dedicated PET detectors and at least one dedicated single photon detector mounted on a single gantry. The single photon detector is a solid-state detector, such as CZT, and the PET detectors are made of a high effective Z material, such as LSO or BGO. Simultaneous PET/single photon imaging studies can be carried by the single system. The solid-state detectors also may be removable and mountable on a separate, dedicated single photon imaging gantry.

16 Claims, 3 Drawing Sheets

COMBINATION PET/SPECT NUCLEAR IMAGING SYSTEM

BACKGROUND OF THE INVENTION

1. Field of the Invention

The present invention generally relates to nuclear medicine, and systems for obtaining nuclear medicine images of a patient's body organs of interest. In particular, the present invention relates to systems that are capable of performing positron emission tomography (PET) as well as planar and single photon emission computed tomography (SPECT).

2. Description of the Background Art

Nuclear medicine is a unique medical specialty wherein radiation is used to acquire images which show the function and anatomy of organs, bones or tissues of the body. Radiopharmaceuticals are introduced into the body, either by injection or ingestion, and are attracted to specific organs, bones or tissues of interest. Such radiopharmaceuticals produce gamma photon emissions which emanate from the body. One or more detectors are used to detect the emitted gamma photons, and the information collected from the detector(s) is processed to calculate the position of origin of the emitted photon from the source (i.e., the body organ or tissue under study). The accumulation of a large number of emitted gamma positions allows an image of the organ or tissue under study to be displayed.

Two basic types of imaging techniques are PET, and planar or SPECT imaging. PET imaging is fundamentally different from planar or SPECT imaging. In PET, events are detected from the decay or annihilation of a positron. When a positron is annihilated within a subject, two 511 KeV gamma rays are simultaneously produced which travel in approximately opposite directions. Two scintillation detectors are positioned on opposite sides of the patient such that each detector will produce an electrical pulse in response to the interaction of the gamma rays with a scintillation crystal. In order to distinguish the detected positron annihilation events from background radiation or random events, the events must be coincident in each detector in order to be counted as "true" events. When a true event is detected, the line connecting the positions of the two points of detection is assumed to pass through the point of annihilation of the positron.

By contrast, single photon imaging, either planar or SPECT, relies on the use of a collimator placed in front of a scintillation crystal or solid state detector, to allow only gamma rays aligned with the holes of the collimator to pass through to the detector, thus inferring the line on which the gamma emission is assumed to have occurred. Both PET and single photon imaging techniques require gamma ray detectors that calculate and store both the position of the detected gamma ray and its energy.

PET imaging systems and single photon imaging systems have been known and commercially available for many years. Recently, manufacturers of single photon imaging systems have modified such systems to enable them to perform PET imaging by adding the capability to detect coincident events (i.e., two gamma ray interactions in opposing detectors occurring within a small time interval).

Present day single photon imaging systems all use large area scintillation detectors made of sodium iodide crystals doped with thallium, or NaI(Tl). NaI(Tl) is well suited for the detection of lower energy (e.g., 140 keV for $^{99m}$Tc and about 72 keV for x-rays from $^{201}$Tl) single photon emitting radioisotopes, but it is not the optimum material for detecting high energy (e.g., 511 keV) positron annihilation isotopes.

In order to efficiently detect 511 keV photons from a positron annihilation, the detector material should have a high stopping power to maximize the probability of interaction of the photon in the detector, and high effective Z (atomic number) to maximize the probability that the gamma photons will be absorbed via the photoelectric effect rather than being scattered via the Compton scattering effect.

Another performance problem with NaI(Tl) detectors is the relatively low count rate capability of such systems. The count rate is the ability to detect and resolve independent gamma events occurring within one second. NaI(Tl) detectors current cannot resolve independent gamma events in excess of a few hundred thousand per second. In the case of PET imaging using NaI(Tl) detectors, the number of gamma pairs detected that are in true coincidence can be as low as 1%. Therefore the true coincidence count rate of a NaI PET detector system is severely limited (~10 k counts/sec) as compared with a dedicated PET imaging system.

Another known hybrid PET/SPECT system uses two relatively new scintillating materials, namely LSO (lutetium oxyorthosilicate) and YSO (yttrium oxyorthosilicate). In this system, the relatively high Z LSO crystal is placed behind the lower Z YSO crystal, forming a sandwich of scintillators, sometimes called a phoswich detector. When carrying out PET imaging, many high energy gammas passing through the low Z detector will be absorbed in the high Z LSO detector, while when performing single photon imaging, a collimator is placed in front of the crystal, and most of the low energy gamma photons will be absorbed in the low Z YSO crystal.

The count rate capability of this proposed system is much higher than NaI because of the faster decay time of the LSO and YSO detector materials as compared with NaI(Tl), and the PET performance is better than NaI because of the higher stopping power and higher effective Z of the LSO material. The single photon imaging capability is provided by the YSO layer, which is slightly inferior to NaI in effective Z, but slightly superior in total light output.

Another recent development in the art is the use of CZT (cadmium zinc telluride) as a solid state (i.e., semiconductor) detector material. As a single photon detector, CZT is superior to NaI in several performance parameters. First, its energy resolution is less than 5%, as compared with 9–10% for NaI. The effective Z of CZT is about the same as NaI, but its density is higher, making its stopping power about 30% better than NaI per unit thickness of material. Third, the count rate capability for CZT detectors is virtually unlimited as compared to a scintillator crystal, because each pixel (or picture element) of the CZT material acts as an independent detector. Thus, unlike a scintillator crystal, in which two events occurring very close in time and spatial location will produce overlapping light output, two gamma photons arriving at exactly the same time in adjacent pixels of a CZT detector could be independently detected and measured accurately with respect to energy, given an optimum electronic circuitry design.

With respect to PET imaging, CZT is not more attractive than NaI in terms of effective Z, but would have a higher count rate capability. In order to maximize the probability of detection, the thickness of the CZT detector should be as large as possible. Thicker material, however, would increase the charge collection time and degrade the temporal resolution which is important for coincidence detection.

Additionally, the high cost of CZT material as compared with NaI may prove prohibitive.

There thus remains a need in the art for a system capable of performing both PET imaging and single photon (planar or SPECT) imaging, separately or simultaneously, without comprising accepted image quality requirements.

SUMMARY OF THE INVENTION

The present invention solves the existing need by providing a combination PET and single photon nuclear imaging system, comprising a gantry, a pair of dedicated PET detectors mounted to the gantry for performing only PET imaging, and at least one dedicated single photon detector mounted to the gantry for performing only single photon imaging.

According to a second aspect of the invention, a method is provided for performing simultaneous PET and single photon nuclear imaging studies, comprising the steps of providing a pair of dedicated PET detectors, providing at least one dedicated solid state detector, acquiring PET imaging data from the pair of dedicated PET detectors, and acquiring single photon imaging data from said at least one dedicated solid state detector.

BRIEF DESCRIPTION OF THE DRAWINGS

The invention will become more clearly understood from the following detailed description in connection with the accompanying drawings, in which.

DETAILED DESCRIPTION OF THE PREFERRED EMBODIMENTS

Figure 1:
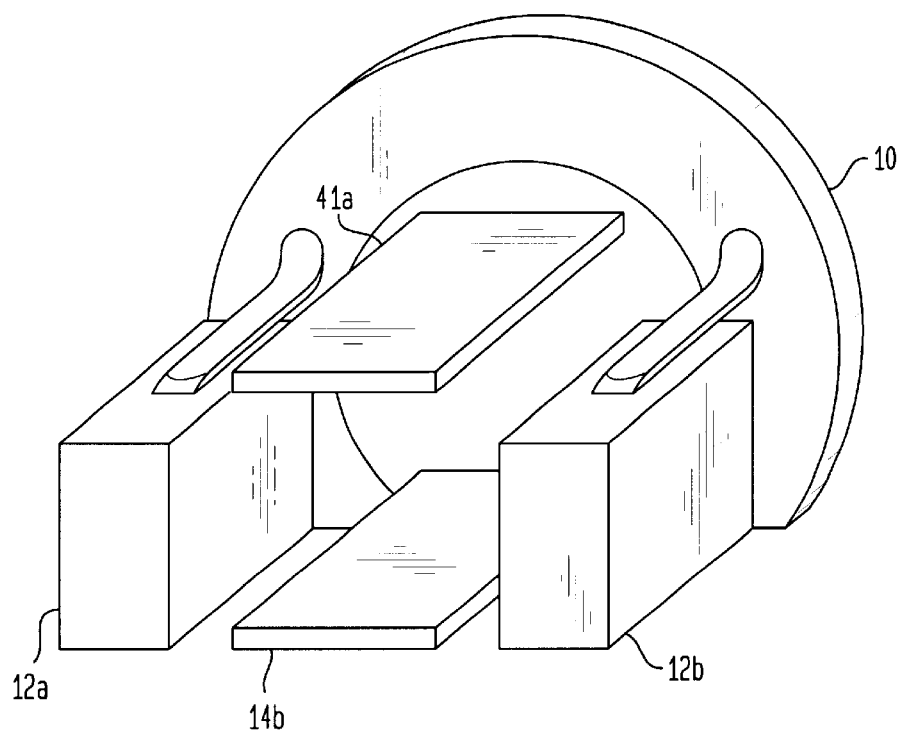
FIG. 1 is a perspective view of a combination gamma radiation imaging system according to one embodiment of the present invention.

Referring to FIG. 1, according to one preferred embodiment of the invention, a combination nuclear imaging system is provided that can carrying out both PET and single photon imaging, either simultaneously or separately. According to this embodiment, a single gantry 10 includes four separate detectors: a pair of PET detectors 12a–12b, and a pair of CZT detectors 14a–14b. The PET detectors 12a–12b are made of high effective Z scintillator material, such as LSO or BGO (bismuth germinate crystal, having the formula $Bi_4Ge_3O_{12}$). In operation, a patient injected with either a low energy radiopharmaceutical, a high energy pharmaceutical, or both, is placed on an imaging bed or patient positioning system (not shown) and moved into position between the detectors 12a–12b and 14a–14b. The PET detectors 12a–12b detect high energy (such as 511 keV) gamma pairs, and the single photon detectors 14a–14b detect low energy (such as 140 keV) gammas.

The present inventors have recognized that combining a solid state detector with a PET detector enables high quality, simultaneous SPECT and PET imaging to be performed. The capability for simultaneous SPECT and PET requires the use of detectors which work effectively in the presence of a significant contribution of background radiation. For instance, when a patient is injected with both PET and SPECT radiopharmaceuticals, the 511 keV photons contribute a large background radiation activity overlying the lower energy SPECT photon emissions.

NaI detectors are severely limited in count rate capability, and 511 keV photons significantly penetrate low energy collimators typically used for SPECT. Thus, in the presence of 511 keV emissions, the performance of a NaI detector is significantly degraded by the number of 511 keV photons reaching the detector and reducing the capability of the NaI detector to image lower energy isotopes simultaneously, because of the high count rate background activity. If a high energy collimator is used to attenuate the high energy photon flux, the spatial resolution and sensitivity are degraded, causing a decrease in image quality. In contrast, using the CZT detector to carry out single photon imaging according to the invention, while simultaneously performing PET imaging using dedicated PET detectors, solves the problems encountered with NaI detectors.

First, the high count rate capability of the CZT detector easily is capable of imaging low energy gamma photons and rejecting the 511 keV photons, without degrading system performance. Further, the better energy resolution of the CZT detector reduces the contribution of scattered photons into the low energy photon count acquisition (and thus image). For a typical NaI(Tl) gamma camera with 9.5% energy resolution, the energy window for imaging 140 keV gammas would be set to a 15% width around the centroid energy, and thus the window would accept all events having detected energies between 129.5 and 150.5 keV. A CZT camera, having energy resolution of less than 5%, could use an energy window of approximately one half the width of the window for NaI cameras, thereby significantly reducing the contribution of false counts to the low energy image by narrowing the window of acceptable detected energies. If the background energy spectrum were a constant continuum, as would be the case with a simultaneous PET imaging, the background would be reduced by one half, in proportion to the window width.

The combination on a single gantry of dedicated PET detectors and solid state CZT detectors dedicated to single photon imaging, thus provides a versatile system that can perform simultaneous PET and SPECT imaging, or separate PET and SPECT imaging, without comprising currently accepted image quality. To the contrary, the performance of the single photon imaging function is improved over the accepted parameters, by virtue of the superior energy resolution of the CZT detector.

Figure 2:
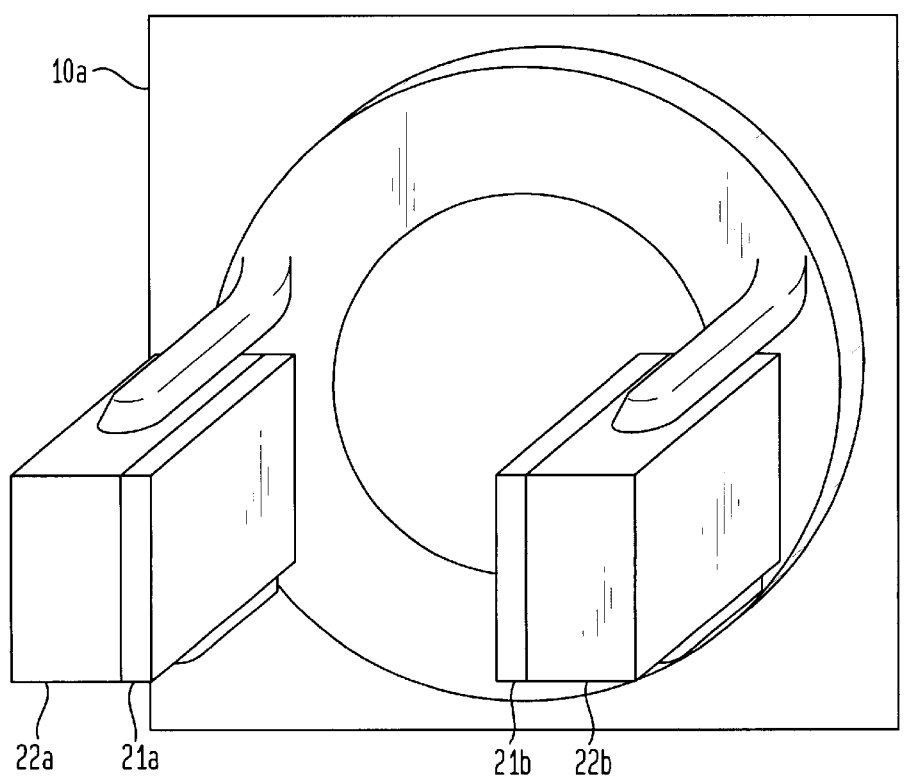
FIG. 2 is a perspective view of a combination gamma radiation imaging system according to a second embodiment of the present invention.

FIG. 2 shows a second embodiment of the present invention. According to FIG. 2, PET detectors 22a and 22b are supported on gantry 10a, and solid-state detectors 21a and 21b are attached to the front faces of the PET detectors 22a and 22b. The solid-state detectors would include low energy collimators, which could be incorporated into the detectors as a single unit. In this embodiment, the higher energy gammas detected for PET imaging would pass directly through the low energy collimators and solid-state detectors, without causing any significant degradation or interference with the single photon imaging function of the solid-state detectors, in the case of simultaneous PET and single photon imaging.

Figure 3:
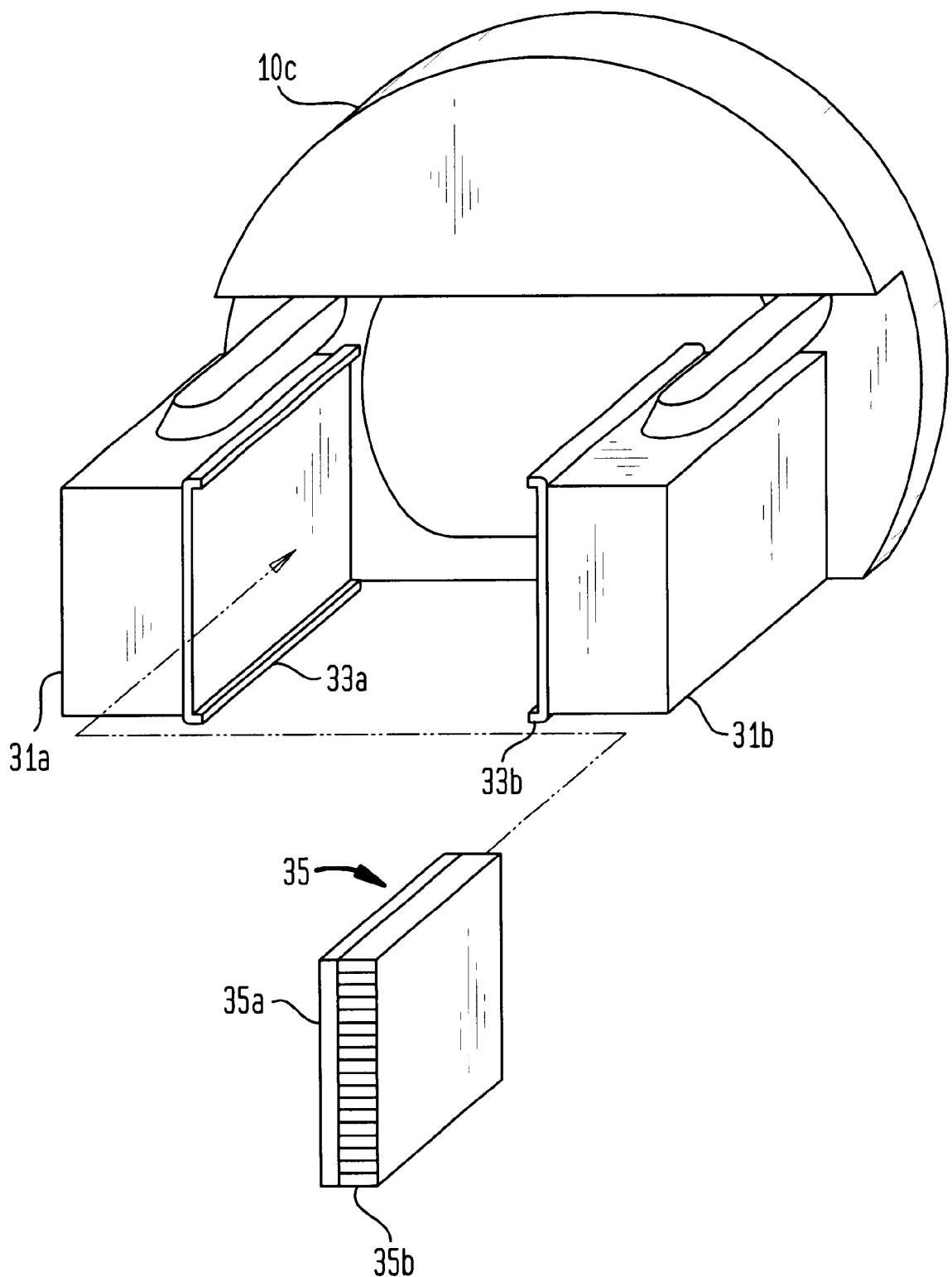
FIG. 3 is a perspective view of a combination gamma radiation imaging system according to a third embodiment of the present invention.

A third embodiment of the invention is shown in FIGS. 3 and 4. According to this embodiment, solid-state detectors, such as detector 35, which is a single unit containing solid-state detector modules 35a and a low energy collimator 35b, are removably attached to supports 33a and 33b coupled to PET detector housings 31a and 31b, in much the same way that conventional collimators are removably attached to conventional gamma camera detector housings.

Figure 4A:
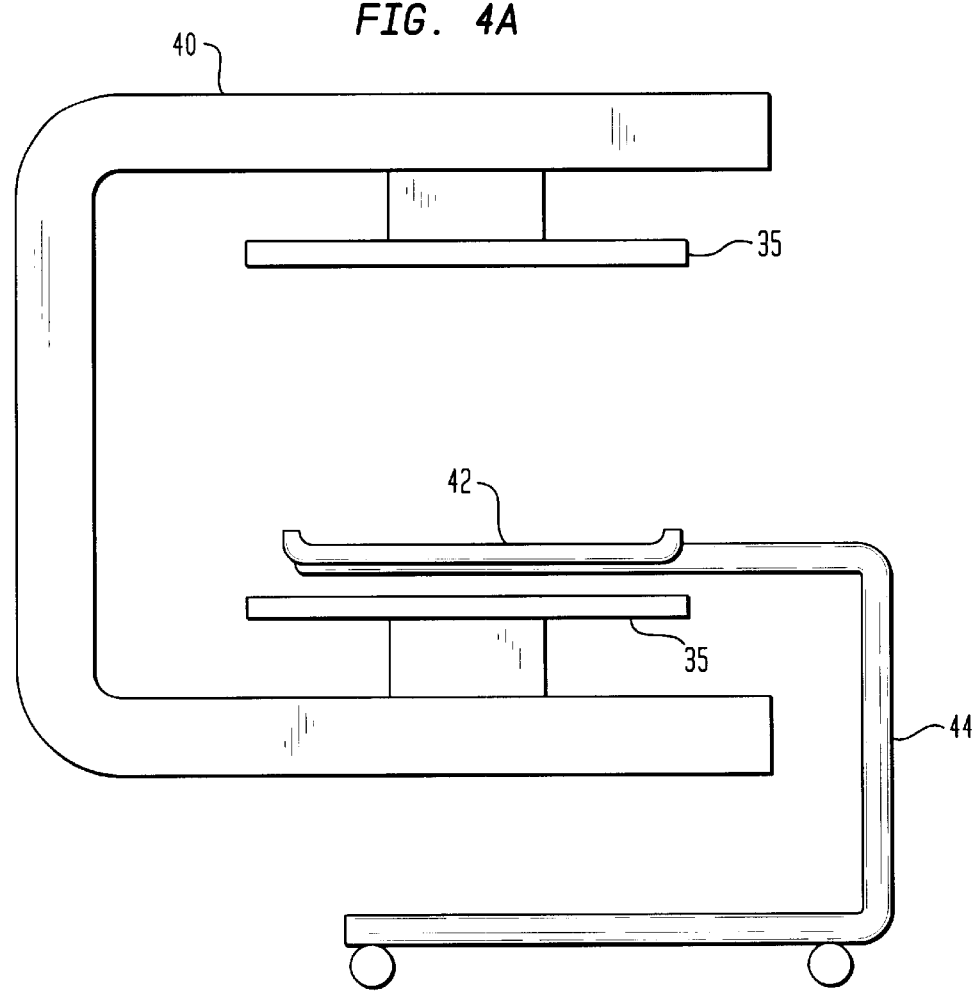
FIGS. 4A and 4B are isometric views of a combination gamma radiation imaging system according to the present invention for performing whole body planar image scanning.
Figure 4B:
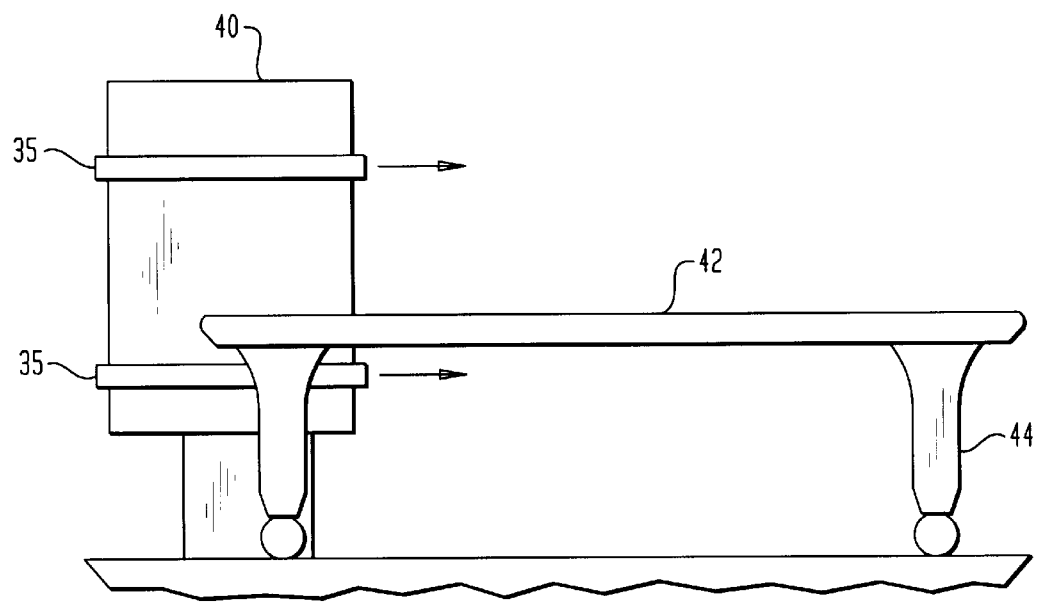

In this embodiment, the solid-state detectors are removable, whereby it is possible to have another, simpler gantry 40, on which the solid-state detectors could be attached to perform dedicated single photon imaging, as shown in FIGS. 4A–4B. A patient lies on imaging bed 42, which is attached to a floor standing support 44. The entire gantry 40 is movable with respect to imaging bed 42 (as indicated by the directional arrows), whereby a full body scan imaging study may be acquired.

Gantry 40 can be made simpler mechanically than the gantry 10c supporting the combination PET/SPECT detectors, because the weight of a solid-state detector is much less than a corresponding NaI scintillation detector. The solid-state detector does not require photomultiplier tubes, and thus also requires less shielding, reducing its weight even further.

The removable solid-state detector offers great flexibility to the nuclear medicine department of a health care institution. Simultaneous PET/SPECT imaging studies can be acquired when the solid-state detectors are mounted on the same gantry. Separate dedicated PET and dedicated single photon studies also can be acquired, simultaneously, when the solid-state detectors are mounted to another gantry. The nuclear medicine department thus has the capability of two dedicated systems to perform imaging on two different patients at the same time, as well as the capability to combine the detectors into a simultaneous PET/SPECT imaging system to perform two simultaneous imaging studies on the same patient.

The invention having been described, it will be apparent to those skilled in the art that the same may be varied in many ways without departing from the spirit and scope of the invention. For example, while LSO and BGO have been given as examples for the PET detector material, and CZT has been given as an example for the solid-state detector material, it is contemplated that other similar materials having similar properties also may be used to achieve the same results. Any and all such modifications are intended to be included within the scope of the following claims.

What is claimed is:

1. A combination PET and single photon nuclear imaging system, comprising:
   a gantry;
   a pair of dedicated PET detectors mounted to said gantry for performing only high energy PET imaging; and
   at least one dedicated single photon detector mounted to said gantry for performing only low energy single photon imaging.

2. A combination PET and single photon nuclear imaging system as set forth in claim 1, wherein said pair of PET detectors are composed of LSO material.

3. A combination PET and single photon nuclear imaging system as set forth in claim 1, wherein said pair of PET detectors are composed of BGO material.

4. A combination PET and single photon nuclear imaging system as set forth in claim 1, wherein said at least one single photon detector is made of solid-state material.

5. A combination PET and single photon nuclear imaging system as set forth in claim 4, wherein said solid-state material is CZT.

6. A combination PET and single photon nuclear imaging system as set forth in claim 1, wherein a pair of dedicated single photon imaging detectors are mounted to said gantry.

7. A combination PET and single photon nuclear imaging system as set forth in claim 6, wherein each of said pair of dedicated single photon detectors is mounted to a front of a respective one of said dedicated PET detectors.

8. A combination PET and single photon nuclear imaging system as set forth in claim 7, wherein each of said pair of dedicated single photon detectors is removably mounted to a respective dedicated PET detector.

9. A combination PET and single photon nuclear imaging system as set forth in claim 8, wherein each of said pair of dedicated single photon detectors includes a solid state detector module and a collimator combined as a single integral unit.

10. A combination PET and single photon nuclear imaging system as set forth in claim 9, further comprising a second gantry wherein said pair of dedicated single photon detectors are removably mountable in said second gantry for performing dedicated single photon imaging studies.

11. A method for performing simultaneous PET and single photon nuclear imaging studies, comprising the steps of:
    providing a pair of dedicated PET detectors;
    providing at least one dedicated solid state detector;
    acquiring only high energy PET imaging data from said pair of dedicated PET detectors; and
    acquiring only low energy single photon imaging data from said at least one dedicated solid state detector.

12. A method as set forth in claim 11, wherein said pair of PET detectors are composed of LSO material.

13. A method as set forth in claim 11, wherein said pair of PET detectors are composed of BGO material.

14. A method as set forth in claim 11, wherein said at least one single photon detector is made of solid-state material.

15. A method as set forth in claim 14, wherein said solid-state material is CZT.

16. A combination PET and single photon nuclear imaging system, comprising:
    a gantry;
    a pair of dedicated PET detectors mounted to said gantry for performing only PET imaging; and
    at least one dedicated single photon detector mounted to said gantry for performing only single photon imaging, wherein
       said at least one dedicated single photon detector is made of solid state material and includes a low energy collimator for collimating single photons of energy lower than high energy coincidence photons detected by said PET detectors.

* * * * *